(12) United States Patent
Shen et al.

(10) Patent No.: US 6,663,811 B2
(45) Date of Patent: Dec. 16, 2003

(54) PROCESS FOR PRODUCING A MOLD

(75) Inventors: Jialin Shen, Blaustein (DE); Bernhard Wiedemann, Ulm (DE)

(73) Assignee: DaimlerChrysler, AG, Ulm (DE)

( * ) Notice: Subject to any disclaimer, the term of this patent is extended or adjusted under 35 U.S.C. 154(b) by 0 days.

(21) Appl. No.: 09/852,509

(22) Filed: May 10, 2001

(65) Prior Publication Data

US 2001/0040310 A1 Nov. 15, 2001

(30) Foreign Application Priority Data

May 10, 2000 (DE) .......................................... 100 22 870

(51) Int. Cl.$^7$ ................................................ B29C 33/38
(52) U.S. Cl. ...................................... 264/220; 264/219
(58) Field of Search ................... 264/219, 220, 264/225

(56) References Cited

U.S. PATENT DOCUMENTS

| | | | |
|---|---|---|---|
| 3,535,416 A | * 10/1970 | Melnick et al. | 264/220 |
| 3,548,050 A | * 12/1970 | Mozer | 264/220 |
| 3,871,611 A | * 3/1975 | Taketa | 249/102 |
| 4,028,455 A | * 6/1977 | Ueda et al. | 264/220 |
| 4,104,347 A | * 8/1978 | Ohashi et al. | 264/219 |
| 4,285,901 A | * 8/1981 | Yotsusuji et al. | 264/220 |
| 4,744,849 A | * 5/1988 | Michaud-Soret | 264/219 |
| 4,834,929 A | * 5/1989 | Dehoff et al. | 264/220 |
| 5,061,427 A | * 10/1991 | Hirzel | 264/219 |
| 5,435,959 A |   7/1995 | Williamson et al. | |
| 5,514,320 A |   5/1996 | Bright | |
| 6,344,160 B1 | * 2/2002 | Holtzberg | 264/219 |

FOREIGN PATENT DOCUMENTS

| | | |
|---|---|---|
| DE | 876 746 B | 5/1953 |
| DE | 11 34 194 B | 12/1958 |
| DE | 18 67 618 U | 12/1958 |
| DE | 20 44 965 A | 3/1972 |
| DE | 690 27 819 T2 | 2/1997 |
| EP | 0 412 891 B1 | 7/1996 |
| JP | 56-62114 * | 5/1981 ................. 264/220 |

OTHER PUBLICATIONS

Patent Abstracts of Japan, vol. 2000, No. 3, Mar. 30, 2000.

* cited by examiner

Primary Examiner—Allan R. Kuhns
(74) Attorney, Agent, or Firm—Pendorf & Cutliff

(57) ABSTRACT

The invention concerns a process for producing a mold, wherein a hollow space is formed within a rigid mold frame (2) which corresponds to the shape of the component to be produced. According to the invention one fills the mold frame, with the exception of an area which surrounds and is in close proximity to the hollow space, with a plurality of filler elements (6), which are formed into at least an essentially incompressible shape. Subsequently, a model (8) of the component to be produced is introduced into the mold and the interstitial space between the model and the filler elements is filled with a masking material or mold shell forming material (4).

4 Claims, 1 Drawing Sheet

PROCESS FOR PRODUCING A MOLD

BACKGROUND OF THE INVENTION

Field of the Invention

The invention concerns a process for producing a mold, wherein an internal space corresponding to the shape of the component to be produced is formed within a mold frame.

Molds have a massive void volume, which is substantially Larger than the volume of the hollow space for the component to be produced, which however it must be dealt with as part of the normal construction process. It is known to introduce separate form inserts to occupy part of this voluminous space. These must however be newly produced each time, for example by milling or molding.

SUMMARY OF THE INVENTION

The invention makes it possible to produce molds more rapidly and with less waste.

As filler elements, with which the rigid mold frame is filled with the exception of the area close to the hollow space, multiple identically-shaped building blocks of a solid material are used in the first embodiment of the invention. In order that the building blocks maintain their position, they could be provided with projections and/or recess, which engage form-fittingly in each other or, as the case may be, in the inner side of the mold frame. Alternatively, or additionally, the construction elements may be constructed of a ferromagnetic material, in which one produces a magnetic flux which holds these together, for example via an electromagnet, which is provided outside of the mold frame.

Since the regularly shaped building blocks can be reused repeatedly, only a relatively small amount of these construction elements is required. Only the actual mold shell, which one produces by any conventional manner, need be stored for re-use and this by itself only requires a comparatively small amount of space.

In a second embodiment of the invention the filler elements are irregularly shaped particles with a hardenable binder, for example hardenable sand. If the binder is water-soluble, then the sand can be recycled and reused.

The inventive process is particularly suitable for the production of molds for the production of fine or precision cast models, for example wax models, as well as for producing molds for plastic injection molding.

BRIEF DESCRIPTION OF THE DRAWINGS

Further characteristics and advantages of the invention can be seen from the following description of two illustrative embodiments and from the figure, to which reference is made. This single figure shows a mold frame, which is filled with many small filler elements, with the exception of a hollow space and a mask material (mold shell, foundry plaster, refractory mass) which surrounds the hollow space.

DETAILED DESCRIPTION OF THE INVENTION

Figure 1:
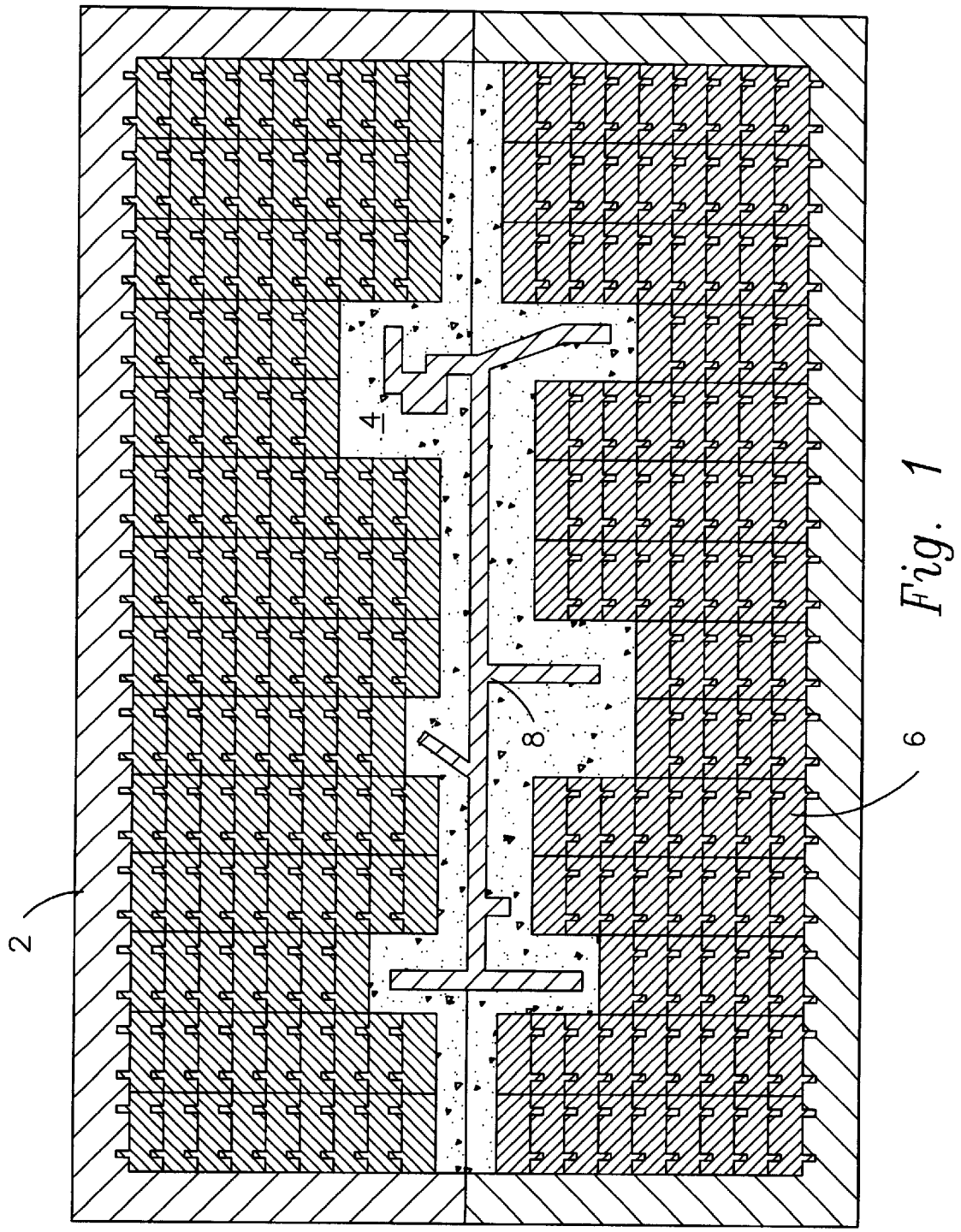

In both embodiments one employs a divided rigid mold frame 2 which is, for example, a milled steel box. Therein a masking material or mold shell material 4 is used to surround and define a hollow space, which is later filled with a material for production of a component.

A variable mold mask or mold shell is formed in the first illustrative example by introducing filler building blocks 6 into the mold frame 2 to the extent that they can be fit. The fill building blocks 6 are small rectangles with essentially identical measurements, with which the mold frame 2 is filled practically without interstitial spaces. The filler building blocks 6 are respectively seated or introduced into the two halves of the mold frame 2 from the respective floors and built up so high, that a massive block is formed, which comes close to but leaves a space about the component to be produced.

The filler building blocks 6 are provided with projections and recesses, with which they form-fittingly engage in each other, and the projections of those filler building blocks 6 which are located in the respective floors of the mold frame 2 engage in correspondingly dimensioned recesses in the mold frame 2. In the illustrative embodiment the projections and recesses are cylindrical journals and boreholes, which allow the filler building blocks 6 to be form fittingly engaged, in the manner of Lego® blocks.

When the filler building blocks 6 are comprised of forromagnetic metal, then instead of the above-described projections and recess, or in addition thereto, they can be secured to each other by providing an electromagnet outside of the steel mold frame 2 and energizing it.

After the construction of the changeable mold mask, a model 8 of the component to be produced, for example a sacrificial wax model of the component to be produced as used in investment casting, is positioned in the mold frame 2, and the intermediate space between the casting model 8 and the filler building blocks 6 is filled with a masking material 4 such as foundry plaster or refractory mass.

For production of a mold for production of precision cast models such as wax models one employs a non-compressible elastomer material as masking material 4. After removal of the casting model 8 the mold is finished. The elasticity of the masking material 4 makes it possible to remove the elastomer mask from the finished wax component without damage. In order to make this possible, the elastomer mask can be slit at critical sections.

In reality there are no absolutely incompressible elastomer materials. Thus, the thickness of the elastomer material has an influence on the precision of the component. With the described variable mold mask the thickness of the elastomer material can be kept to a minimum, so that precision can be increased without having each time to produce a special support shape and to store this. Only the mask itself need be stored, and when new wax components are to be produced, one can reconstruct the appropriate support structure again simply from the filler building blocks 6.

Since the mold frame 2 can be filled with the reusable filler building blocks 6, it can be adapted to various machine sizes and be employed for the most various parts.

For production of a mold for a plastic injection molding with the above described variable mold mask one employs a rigid mask material 4 which is produced in accordance with any one of the known "rapid-tooling" processes such as for example 3D-Keltool®, DMLS® and RapidSteel®. For example a pre-form is formed with silicone, and in the silicone a mixture of metal powder and binder is formed. This is sintered, in order to fix the volume, and subsequently copper is infiltrated.

In a second embodiment the voluminous part of the mold frame 2 is filled with hardenable mold sand instead of the filler building blocks 6. First, the pre-form 8 thickened with, for example, kneading mass, and positioned in one half of the mold frame 2. Subsequently one pours the sand into the mold and removes the pre-form model 8. In certain cases one could here employ the vacuum-sack technique, in order to supplementally compact the sand. Thereafter a polymerization reaction is initiated, for example by a chemical or thermal activation. In order to bond the sand particles to each other, one could employ cross-polymerizable binders (for example phenol resins) as well as aqueous binders (PVP). In the case of PVP this sand can be recycled in simple manner.

Subsequently one can fill the interstitial space between the pre-form or casting model 8 and the hardened filling sand with an elastomer material, in order to produce a mold for the production of precision cast models. The hardened form sand is resistant, as is well known, to high pressures. Therewith one has the possibility of maintaining an almost constant dimension of the elastomer mask, whereby a higher precision can be achieved.

As before, in the second illustrative embodiment one can also produce a mold for plastic injection molding by means of a "rapid-tooling" technique.

What is claimed is:

1. Process for producing a mold, including forming a hollow space within a rigid mold frame, which hollow space corresponds to the shape of a component to be produced, said process comprising filling the rigid mold frame (2) with the exception of an area, which is in close proximity to and surrounds the hollow space, with multiple identically shaped building blocks (6), which are joined into a substantially incompressible shape, introducing a model (8) of the component to be produced into the area, and filling the area between the model and the building blocks with a mask material (4).

2. Process according to claim 1, wherein the building blocks are repeating units of a solid material.

3. Process for producing a mold, including forming a hollow space within a rigid mold frame, which hollow space corresponds to the shape of a component to be produced, said process comprising filling the rigid mold frame (2) with the exception of an area, which is in close proximity to and surrounds the hollow space, with a plurality of building blocks (6), which are joined into a substantially incompressible shape, introducing a model (8) of the component to be produced into the area, and filling the area between the model and the building blocks with a mask material (4), wherein the building blocks (6) and/or the mold frame (2) are provided with projections and/or recesses, which form-fittingly engage in said building blocks, in order to form at least one solid shape.

4. Process for producing a mold, including forming a hollow space within a rigid mold frame, which hollow space corresponds to the shape of a component to be produced, said process comprising filling the rigid mold frame (2) with the exception of an area, which is in close proximity to and surrounds the hollow space, with a plurality of building blocks (6), which are joined into a substantially incompressible shape, introducing a model (8) of the component to be produced into the area, and filling the interstitial space between the model and the building blocks with a mask material (4), wherein the building blocks (6) are comprised of a ferromagnetic material, and wherein said process includes producing a magnetic flux in order to connect these building blocks into at least one solid shape.

* * * * *